United States Patent
Tak et al.

(10) Patent No.: US 7,142,279 B2
(45) Date of Patent: Nov. 28, 2006

(54) DIVISIONALLY EXPOSING AN ACTIVE AREA IN LCD WITH A PLURALITY OF SHOTS

(75) Inventors: Young-Mi Tak, Seoul (KR);
Woon-Yong Park, Suwon (KR);
Kwon-Young Choi, Seoul (KR);
Myung-Jae Park, Gwangju (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/469,197

(22) PCT Filed: Sep. 18, 2002

(86) PCT No.: PCT/KR02/01764

§ 371 (c)(1),
(2), (4) Date: Sep. 23, 2003

(87) PCT Pub. No.: WO03/042501

PCT Pub. Date: Jun. 26, 2003

(65) Prior Publication Data

US 2004/0207798 A1    Oct. 21, 2004

(30) Foreign Application Priority Data

Dec. 14, 2001  (KR) ............... 10-2001-0079365
May 14, 2002  (KR) ............... 10-2002-0026467

(51) Int. Cl.
*G02F 1/13*     (2006.01)
(52) U.S. Cl. .............. 349/187; 430/5; 430/312; 430/314
(58) Field of Classification Search ............... 349/187
See application file for complete search history.

(56) References Cited

U.S. PATENT DOCUMENTS

| 5,656,526 | A | * | 8/1997 | Inada et al. ............... 430/314 |
| 5,945,256 | A | * | 8/1999 | Kim et al. ............... 430/312 |
| 5,953,093 | A |   | 9/1999 | Hirata et al. ............... 349/143 |
| 6,147,722 | A | * | 11/2000 | Shimada et al. ............... 349/43 |
| 6,784,949 | B1 | * | 8/2004 | Nagata et al. ............... 349/39 |

FOREIGN PATENT DOCUMENTS

| KR | 2000-0010252 | 2/2000 |
| WO | WO 02/42840 A2 | 5/2002 |

OTHER PUBLICATIONS

PCT International Search Report; International application No. PCT/KR02/01764; International filing date: Sep. 18, 2002; Date of Mailing: Feb. 27, 2003.

\* cited by examiner

*Primary Examiner*—Andrew Schechter
*Assistant Examiner*—(Nancy) Thanh-Nhan P Nguyen
(74) *Attorney, Agent, or Firm*—Cantor Colburn LLP (57) ABSTRACT

In a method of manufacturing a liquid crystal display using a divisional exposure for a substrate, an overlapping area at the boundary between adjacent shots is provided and the shots left and right to the boundary are exposed in a way that the areas of the shots gradually decreases and gradually increases, respectively, to reduce the brightness difference due to stitch errors between the two shots. For example, the number of unit stitch areas assigned to the left gradually decreases and the number of unit stitch areas assigned to the right shot gradually increases as it goes to the right along the transverse direction in the stitch area. A unit stitch includes an area obtained by dividing a pixel into at least two parts.

7 Claims, 9 Drawing Sheets

STITCH AREA

STITCH AREA

STITCH AREA

EXACT ALIGNMENT                MIS ALIGNMENT

CONVENTIONAL ART    PRESENT INVENTION

DIVISIONALLY EXPOSING AN ACTIVE AREA IN LCD WITH A PLURALITY OF SHOTS

BACKGROUND OF THE INVENTION (a) Field of the Invention

The present invention relates to a method of manufacturing a liquid crystal display ("LCD"), and in particular, to a method of manufacturing an LCD for reducing the brightness difference due to the stitch error generated during manufacturing an LCD panel by divisional exposure.

(b) Description of the Related Art

Generally, for an LCD panel having an active area larger than the size of an exposure mask, divisional exposure dividing the active area and performing step-and-repeat process is required for forming patterns in the active area. That is, the active area is required to be exposed using at least two "shots." In practice, since the shots are subject to shift, rotation and distortion, the shots are misaligned (referred to as "stitch error" hereinafter) to generate the difference between the shots in parasitic capacitances generated between wires and pixel electrodes and in the locations of the patterns.

The difference in parasitic capacitances and in the locations of the patterns results in the difference in electric characteristics and in the aperture ratios between the shots of the LCD panel, thereby causing the difference in the brightness between the shots to appear at the boundary between the shots.

Figure 1:
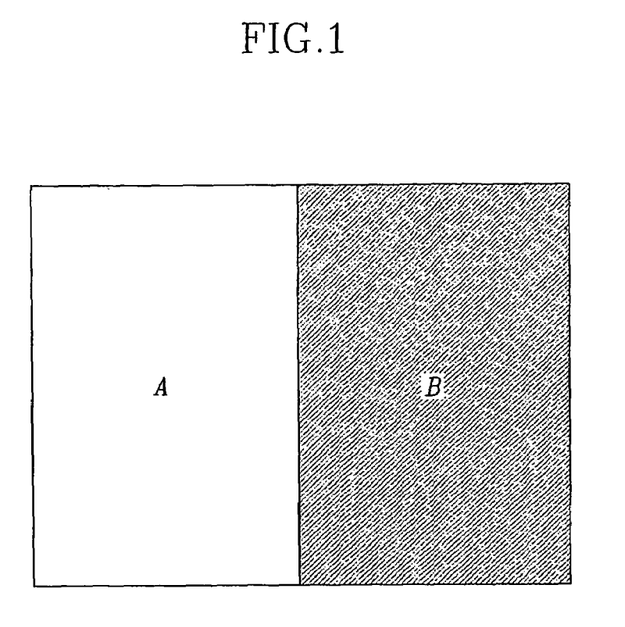
FIGS. 1 and 2 are plan views showing two adjacent shots of a conventional LCD.

FIG. 1 is a plan view showing the boundary between shots of a conventional LCD panel.

As shown in FIG. 1, the brightness difference in adjacent shots A and B due to the stitch error is predominant at the boundary between the shots and appears as a stripe.

Figure 2:
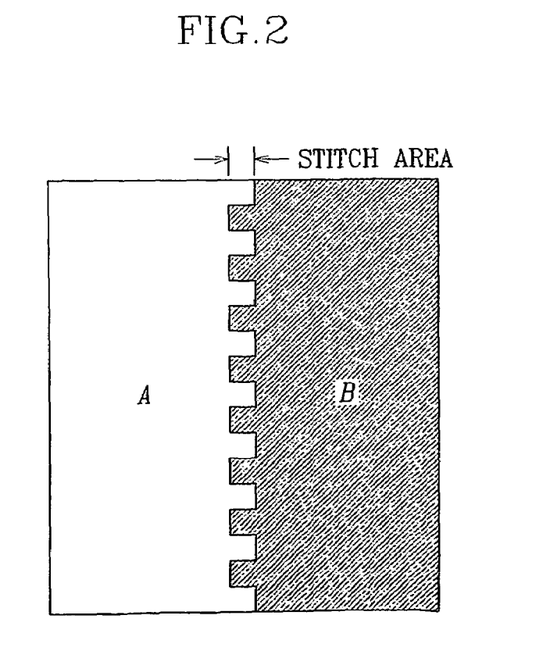
Figure 8A:
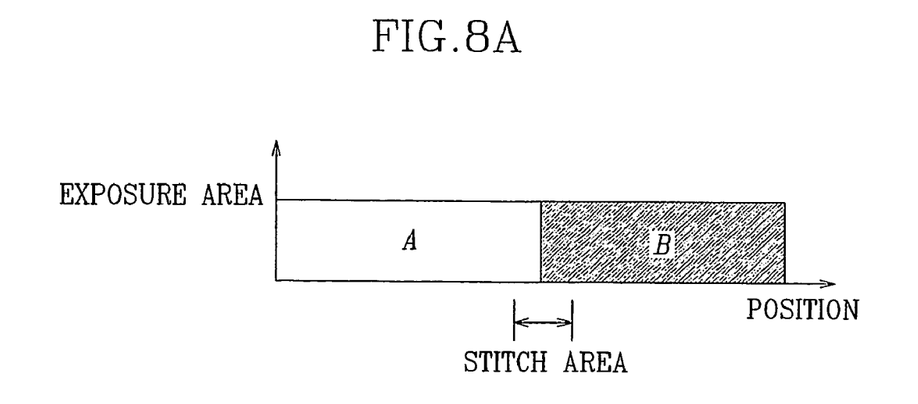
FIGS. 8A and 8B illustrate exposure areas occupied by shot A and shot B near a boundary area between shots of a conventional LCD.
Figure 8B:
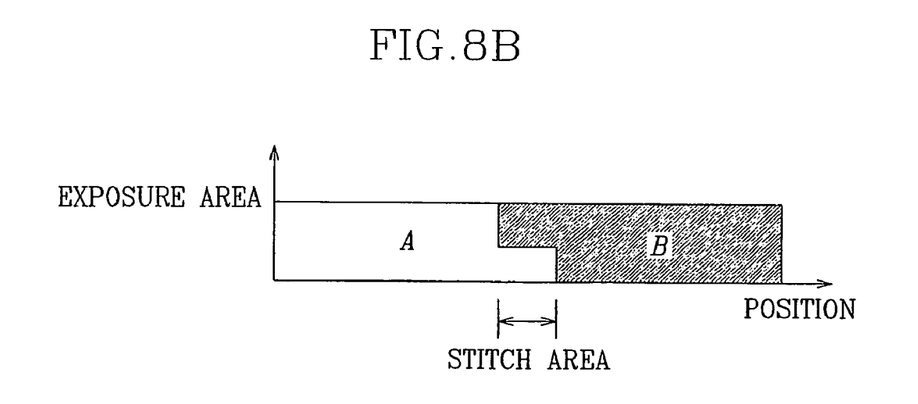
Figure 9A:
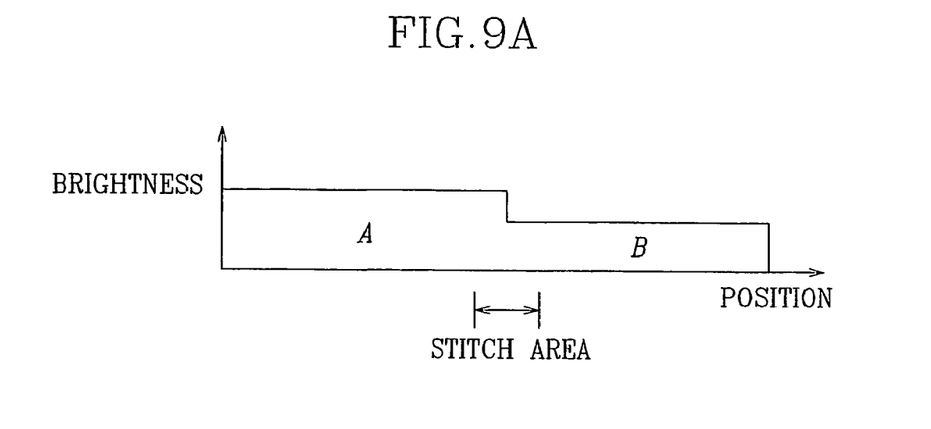
FIGS. 9A and 9B illustrate the brightness difference between shorts of a conventional LCD.
Figure 9B:
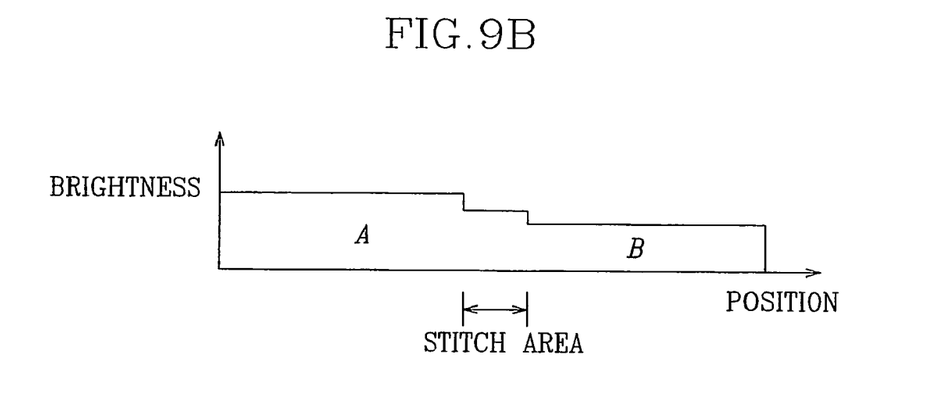

For reducing the brightness difference, a conventional method of manufacturing an LCD makes the shot boundary have a saw shape as shown in FIG. 2. A plan view of two adjacent shots configured in this way is shown in FIG. 2, and the exposure areas and the brightness thereof are respectively shown in FIGS. 8B and 9B. Although the brightness difference between the shots is one-step reduced at the boundary area between the shots as shown in the figures, the stripe is still visible by the human eyes. Moreover, a mosaic pattern may be observed when a unit stitch area is large.

SUMMARY OF THE INVENTION

It is an object of the present invention to provide a method of manufacturing a panel for an LCD for reducing the brightness difference between shots due to a stitch error when observed with the naked eyes.

To achieve the above object, an overlapping area called "stitch area" is provided at the boundary between shots in a divisional exposure process, and the exposure areas for left and right shots gradually increases or decreases, respectively, as goes along a transverse direction in the stitch area. At this time, a pixel is divided into more than two subareas to be used as unit stitch areas.

The pixel area is preferably defined by intersections of two adjacent gate lines and data lines and the unit stitch area is defined by one of areas obtained by dividing the pixel area along a division line parallel to the gate lines or the data lines.

As described above, the brightness at the boundary between shots is gradually varied by gradually changing the exposure areas between right and left shots in a divisional exposure process, thereby making a boundary line between the shots obscure.

RESPECTIVELY DETAILED DESCRIPTION OF THE PREFERRED EMBODIMENTS

Preferred embodiments of the present invention will be described in detail with reference to the accompanying drawings for those skilled in the art to easily carry out.

Figure 3:
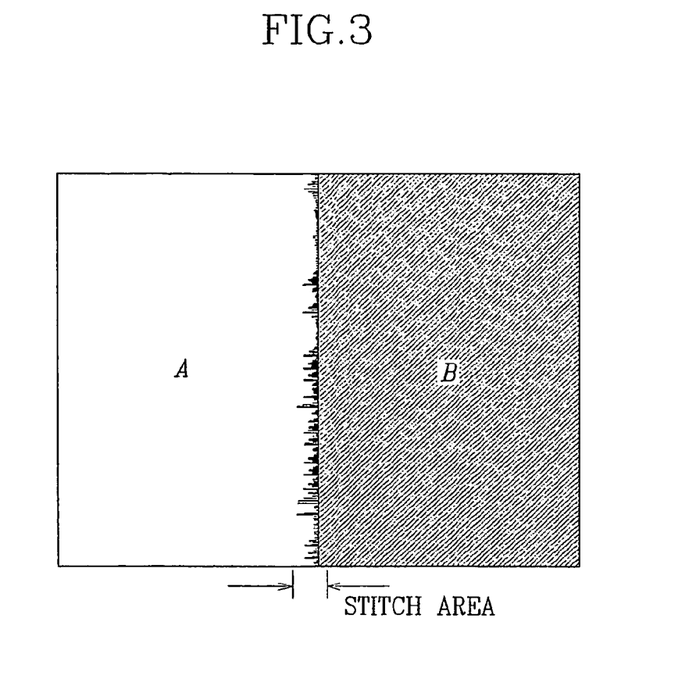
FIG. 3 is a plan view showing shots A and B of an LCD according to first and second embodiments of the present invention.

FIG. 3 is a plan view showing adjacent shots of an LCD panel according to embodiments of the present invention.

Figure 4:
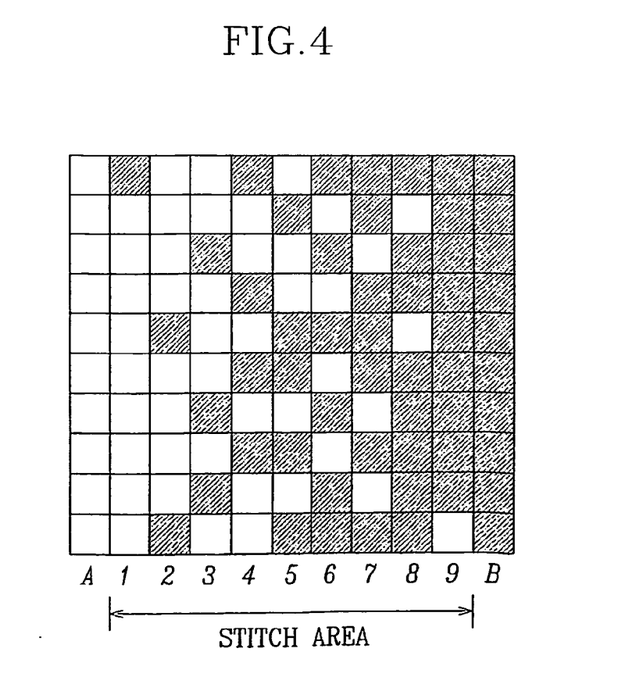
FIG. 4 is a plan view showing a boundary area between shots of an LCD according to the first embodiment of the present invention.

FIG. 4 is a plan view showing a boundary area between shots of an LCD according to the first embodiment of the present invention.

Figure 5:
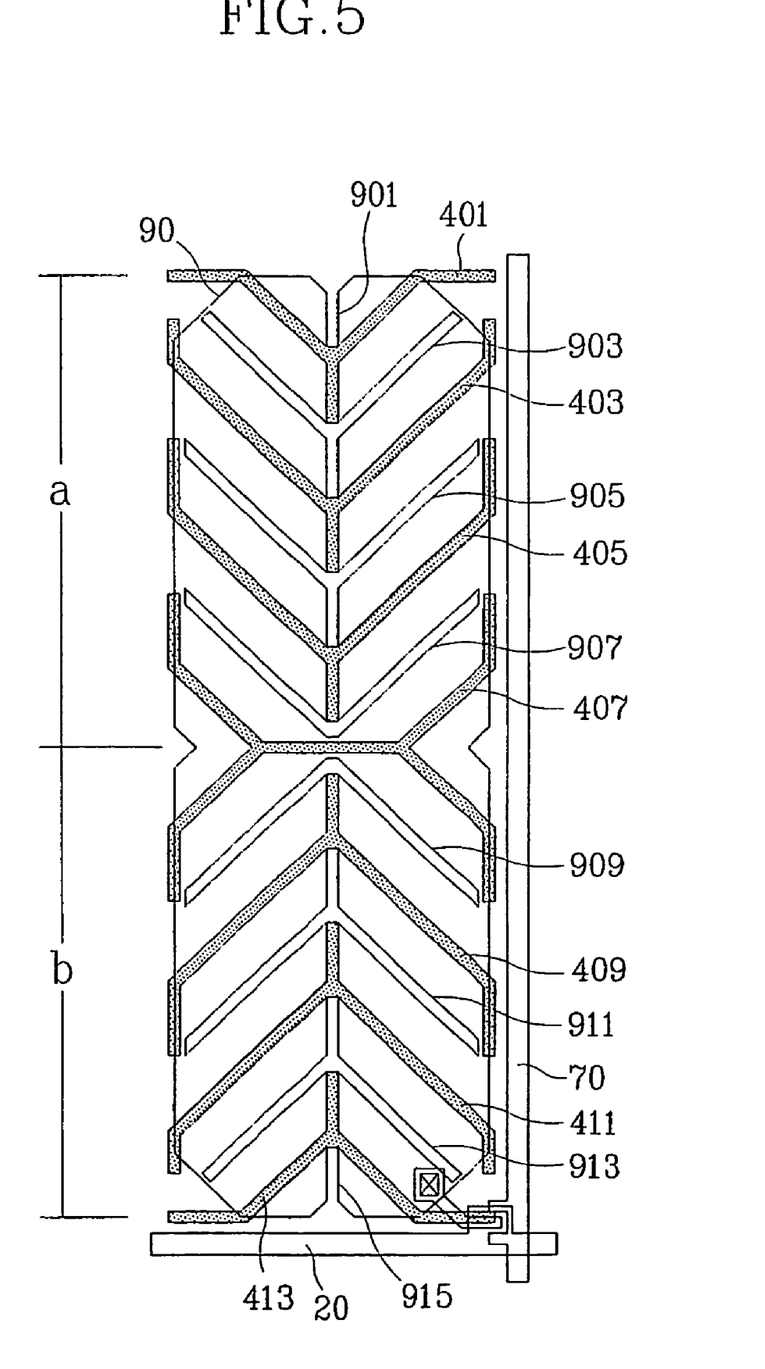
FIG. 5 is a plan view showing a unit stitch area of an LCD according to the first embodiment of the present invention.

FIG. 5 is a plan view showing a unit stitch area of an LCD according to the first embodiment of the present invention.

A stitch area is an overlapping area between two adjacent shots such as a left shot A (represented as a white area) and a light shot B (represented as a black area) as shown in FIG. 4. The stitch area is divided into a plurality of unit stitch areas, for example, 10×9 unit stitch areas as shown in FIG. 4. The unit stitch area refers to one basic area of the stitch area divided by n×m blocks (where n and m are natural numbers).

In this embodiment, a pixel includes two or more unit stitch areas. The reduced size of the unit stitch area prevents a mosaic pattern. As shown in FIG. 5, a pixel is divided into two areas a and b used as unit stitch areas according to the first embodiment of the present invention.

The unit stitch area of the first embodiment of the present invention will be described more in detail with reference to FIG. 5.

As shown in FIG. 5, a pixel area on a thin film transistor ("TFT") array panel is defined by intersections of a plurality of gate lines 20 extending in a transverse direction and a plurality of data lines 70 extending in a longitudinal direction. A TFT and a pixel electrode 90 having a plurality of apertures 901, 903, 905, 907, 909, 911, 913 and 915 are provided in each pixel area. A common electrode (not shown) having a plurality of apertures 401, 403, 405, 407, 409, 411 and 413 is formed on a color filter panel (not shown) opposite the TFT array panel. The apertures 401, 403, 405, 407, 411, and 413 on the common electrode are hatched. The apertures 901, 903, 905, 907, 909, 911, 913 and 915 of the pixel electrode 90 and the apertures 401, 403, 405, 407, 411 and 413 of the common electrode are arranged in turns and partition the pixel area into a plurality of subareas. In this case, a boundary between the areas a and b is defined by an aperture 407 of the common electrode.

According to the first embodiment of the present invention, each of the two areas a and b forming a pixel area is used as a unit stitch area, and the area a is exposed by shot A while the area b is exposed by shot B. In this way, since the brightness difference is much diluted compared with that for a case that a unit stitch area includes a pixel area, the stains such as a mosaic pattern is prevented. In addition, the aperture 407 disposed at the boundary between the unit stitch areas blocks a boundary line between shots which may appear even dimly due to the brightness difference between the unit stitch areas.

A method of manufacturing an LCD panel for reducing stitch errors in accordance with the first embodiment of the present invention will be described with reference to FIG. 4.

According to the first embodiment of the present invention, the number of unit stitch areas for shot A in a stitch area gradually decreases and the number of unit stitch areas for shot B in a stitch area gradually increases as goes to the right along the transverse direction, thereby making the brightness in the stitch area continuously change. Here, the unit stitch areas for a shot refer to the unit stitch areas exposed by the shot.

For example, in a stitch area including nine columns and ten rows of unit stitch areas, the first column has nine unit stitch areas for shot A and one unit stitch area for shot B, the second column has eight unit stitch areas for shot A and two unit stitch areas for shot B, the third column has seven unit stitch areas for shot A and three unit stitch areas for shot B, and so on. Preferably, the unit stitch areas for each shot A or B are not gathered. It is because, if so, a macroscopic stain may appear.

To summarize, the number of unit stitch areas for shot A gradually decreases while the number of unit stitch areas for shot B gradually increases along the transverse direction.

Figure 8C:
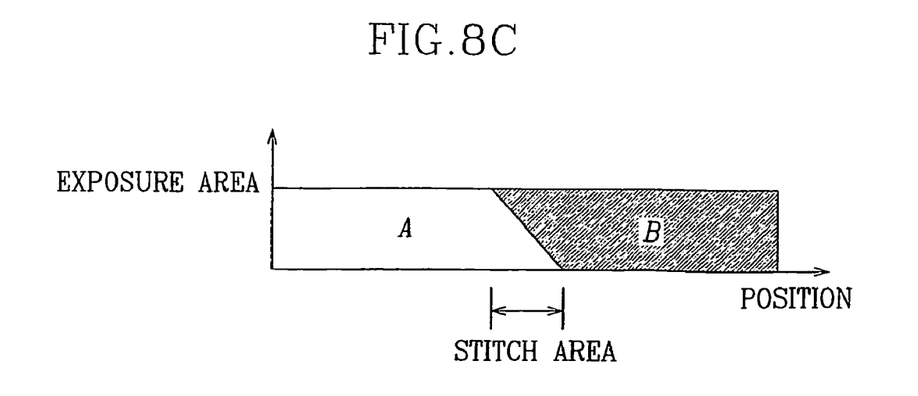
FIG. 8C illustrates exposure areas occupied by shot A and shot B near a boundary area between shots according to the first and the second embodiments of the present invention.

FIG. 8C illustrates exposure areas for shot A and shot B and a stitch area along the transverse direction. As shown in FIG. 8C, since the number of unit stitch areas for shot A and that of shot B decreases and increases, respectively, along the transverse direction in the first embodiment of the present invention, the brightness difference between the shots A and B gradually changes.

Figure 9C:
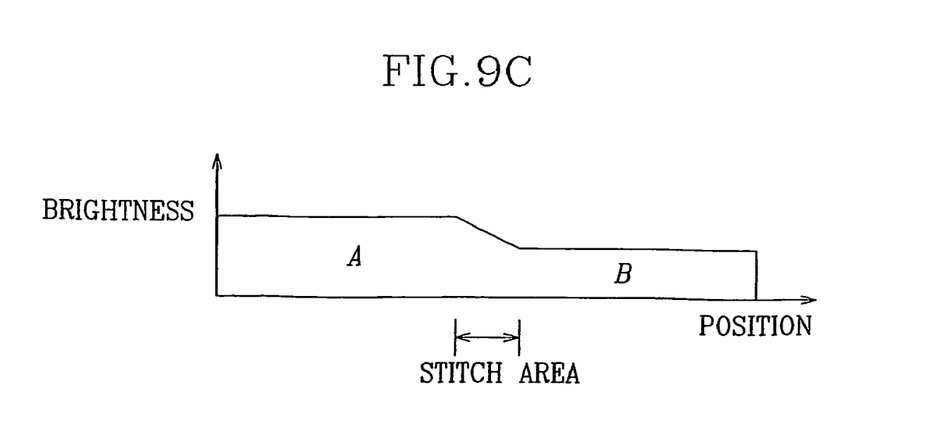
FIG. 9C illustrates the brightness difference between shorts according to the first and the second embodiment of the present invention.

FIG. 9C illustrates the brightness of adjacent shorts and a stitch area therebetween of an LCD panel according to the first embodiment of the present invention.

The horizontal axis shown in FIG. 9C indicates shot A, a stitch area, and shot B along an increasing direction, and the vertical axis shown in FIG. 9C indicates brightness. In this graph, which shows the brightness in the stitch area when shot A is brighter than shot B, the stitch area becomes gradually darker as it goes from area A to area B.

Figure 6:
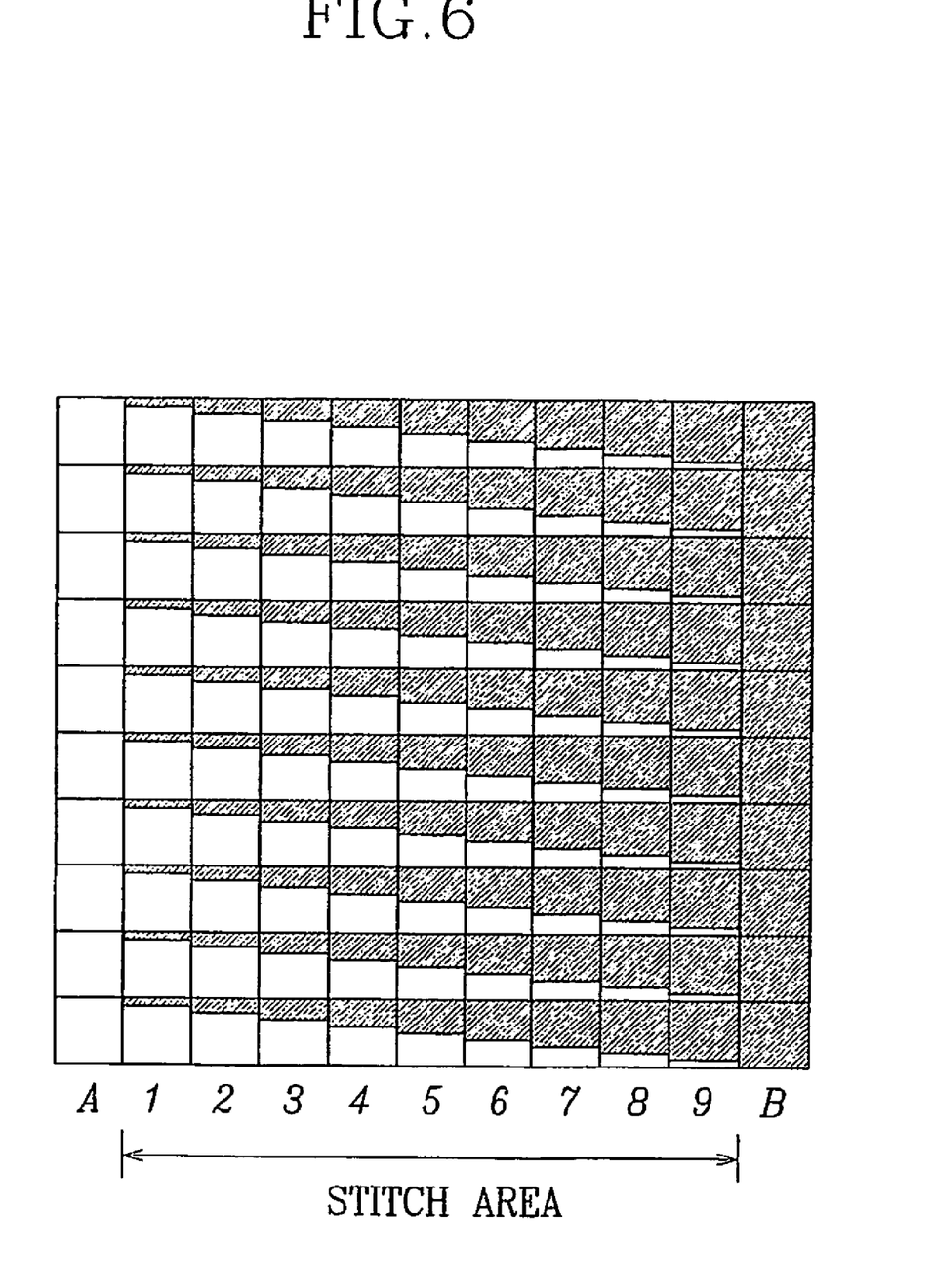
FIG. 6 is a plan view showing a boundary area between shots of an LCD according to the second embodiment of the present invention.
Figure 7:
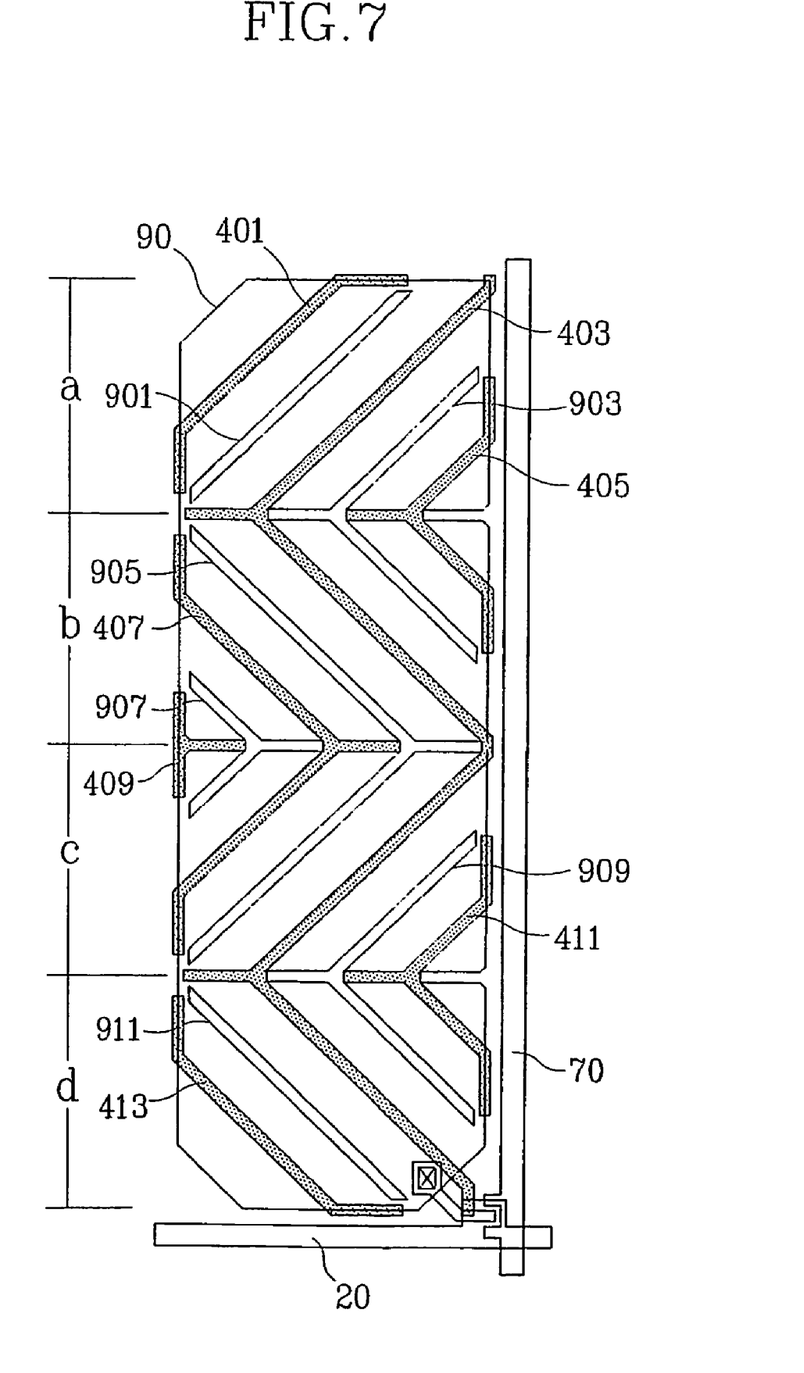
FIG. 7 is a plan view showing a unit stitch area of an LCD according to the second embodiment of the present invention.

FIG. 6 is a plan view showing the boundary area between shots of an LCD according to a second embodiment of the present invention, and FIG. 7 is a plan view showing unit stitch areas of an LCD according to the second embodiment of the present invention.

As shown in FIG. 6, the second embodiment of the present invention arranges the shots such that the exposure area for shot A in each unit stitch area gradually decreases in the stitch area while the exposure area for shot B in the unit stitch area gradually increases as goes to the right along the transverse direction in the stitch area. As a result, the brightness in the stitch area gradually changes.

For example, in a stitch area including nine columns and ten rows of unit stitch areas, each unit stitch area of the first column assigns its 90% area to shot A and its 10% area to shot B, each unit stitch area of the second column assigns its 80% area to shot A and its 20% area to shot B, each unit stitch area of the third column assigns its 70% area to shot A and its 30% area to shot B, and so on.

To summarize, an area in a unit stitch area assigned to shot A gradually decreases while an area of the unit stitch area assigned to shot B gradually increases along the transverse direction.

This arrangement gradually varies the brightness between the unit stitch areas for the shots A and B along the transverse direction.

In this embodiment, a pixel includes two or more unit stitch areas. The reduced size of the unit stitch area prevents a mosaic pattern. As shown in FIG. 7, a pixel is divided into four areas a, b, c and d used as unit stitch areas according to a second embodiment of the present invention.

Now, the unit stitch areas according to the second embodiment of the present invention will be described more in detail with reference to FIG. 7.

As shown in FIG. 7, a pixel area on a TFT array panel is defined by intersections of a plurality of gate lines 20 extending in a transverse direction and a plurality of data lines 70 extending in a longitudinal direction. A TFT and a pixel electrode 90 having a plurality of apertures 901, 903, 905, 907, 909, 911, and 913 are provided in each pixel area. A common electrode (not shown) having a plurality of apertures 401, 403, 405, 407, 409, 411 and 413 is formed on a color filter panel (not shown) opposite the TFT array panel. The apertures 401, 403, 405, 407, 411, and 413 on the common electrode are hatched. The apertures 901, 903, 905, 907, 909 and 911 of the pixel electrode 90 and the apertures 401, 403, 405, 407, 411 and 413 of the common electrode are arranged in turns and partition the pixel area into a plurality of subareas. The arrangements of the apertures in the areas a and b are symmetrical with respect to their boundary, the arrangements of the apertures in the areas b and c are symmetrical with respect to their boundary, and the arrangements of the apertures in the areas c and d are symmetrical with respect to their boundary. The boundaries between the areas a, b, c and d are defined by the apertures 401, 403, 405, 407, 409, 411, 413 of the pixel electrode and the apertures 901, 903, 905, 907, 909, and 911 of the common electrode. In this embodiment, although the apertures are exemplified as subarea-dividing members, a plurality of protrusions or depressions may also be used as subarea-dividing members.

According to the second embodiment of the present invention, each of the four areas a, b, c and d forming a pixel area is used as a unit stitch area, and exposed by one of shot A and shot B. Exemplary combinations of areas for shot A and shot B are (a; b, c and d), (a and b; c and d), (a, b and c; d), and (a and d; b and c). In this way, since the brightness difference is much diluted compared with that for a case that a unit stitch area includes a pixel area, the stains such as a mosaic pattern is prevented. In addition, the apertures 401, 403, 405, 407, 409, 411, 413, 901, 903, 905, 907, 909, 911 disposed at the boundary between the unit stitch areas block boundary lines between shots which may appear even dimly due to the brightness difference between the unit stitch areas.

The exposure areas and the brightness of the adjacent shots according to the second embodiment of the present invention are illustrated in FIGS. 8C and 9C, respectively. The descriptions about FIGS. 8C and 9C according to the second embodiment are substantially the same as that according to the first embodiment.

Figure 10:
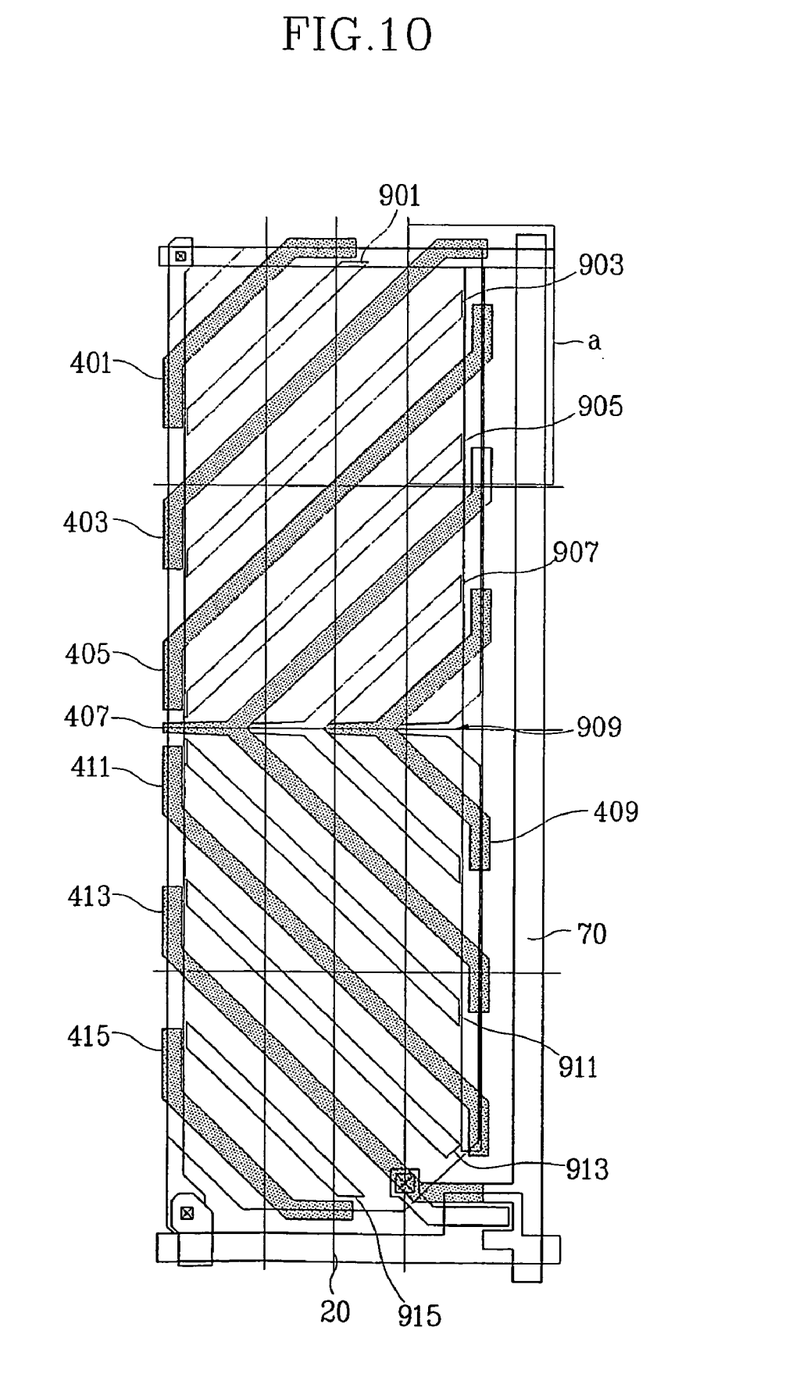
FIG. 10 is a plan view showing a unit stitch area of an LCD according to the third embodiment of the present invention.

FIG. 10 is a plan view showing a unit stitch area of an LCD according to the third embodiment of the present invention.

As shown in FIG. 10, a pixel area on a tin film transistor array panel is defined by intersections of a plurality of gate lines 20 extending in a transverse direction and a plurality of data lines 70 extending in a longitudinal direction. A TFT and a pixel electrode 90 having a plurality of apertures 901, 903, 905, 907, 909, 911, 913 and 915 are provided in each pixel area. A common electrode (not shown) having a plurality of apertures 401, 403, 405, 407, 409, 411, 413 and 415 is formed on a color filter panel (not shown) opposite the TFT array panel. The apertures 401, 403, 405, 407, 411, 413 and 415 on the common electrode are hatched. The apertures 901, 903, 905, 907, 909, 911, 913 and 915 of the pixel electrode 90 and the apertures 401, 403, 405, 407, 411, 413 and 415 of the common electrode are arranged in turns and partition the pixel area into a plurality of subareas. In this embodiment, although the apertures are exemplified as subarea-dividing members, a plurality of protrusions or depressions may also be used as subarea-dividing members.

In this embodiment, a pixel area includes sixteen unit stitch areas. In FIG. 10, area a represents a unit stitch area.

According to the third embodiment of the present invention, each of the sixteen areas forming a pixel area is used as a unit stitch area and exposed by different shot. In this way, since the brightness difference is much diluted compared with that for cases that a unit stitch area includes an area obtained by dividing a pixel area along a transverse direction according to the first and second embodiments of the present invention, the stains such as a mosaic pattern is prevented.

In the third embodiment, the unit stitch area includes one of equally-divided sixteen areas of one pixel area. However, the number of the division of one pixel for defining the unit stitch area may be larger than or smaller than sixteen.

A distinctive feature of the third embodiment of the present invention distinguished from the second embodiment is that the division of one pixel for defining the unit stitch area is performed along the longitudinal direction as well as the transverse direction.

Figure 11:
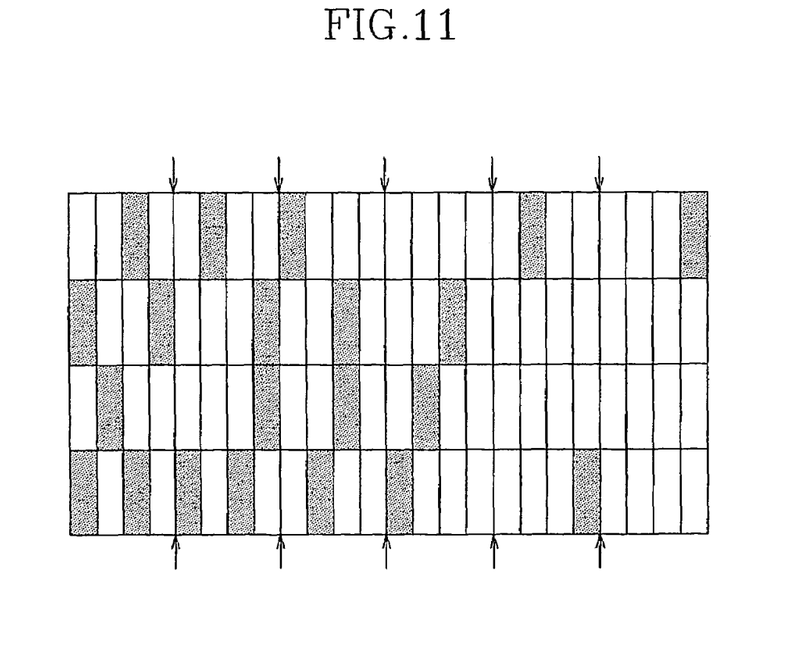
FIG. 11 shows the number of unit stitch areas included in shot A and shot B in a boundary area between the shots A and B.

FIG. 11 shows the number of unit stitch areas included in shot A and shot B in a boundary area between the shots A and B when an LCD is manufactured according to the third embodiment of the present invention. In FIG. 11, white color represents the areas of shot A and black color represents the areas of shot B. Also, boundaries indicated by arrows represent boundaries between pixel areas.

As shown in FIG. 11, the number of the unit stitch areas of shot B is six in the leftmost pixel area, while the number of the unit stitch areas of shot B is one in the rightmost pixel area. The number of the unit stitch areas of shot B deceases as it goes to the right. To consider the areas not shown in the figure, all unit stitch areas are those of shot B since the number of the unit stitch areas of shot B increases as it goes to the left. Similarly, all unit stitch areas are those of shot A since the number of the unit stitch areas of shot B deceases while that of shot A increase as goes to the right.

Therefore, even if misalignment occurs, the width of a subarea offset from an expected value predominantly decreases compared with a conventional art. This will be described with reference to FIG. 12.

Figure 12:
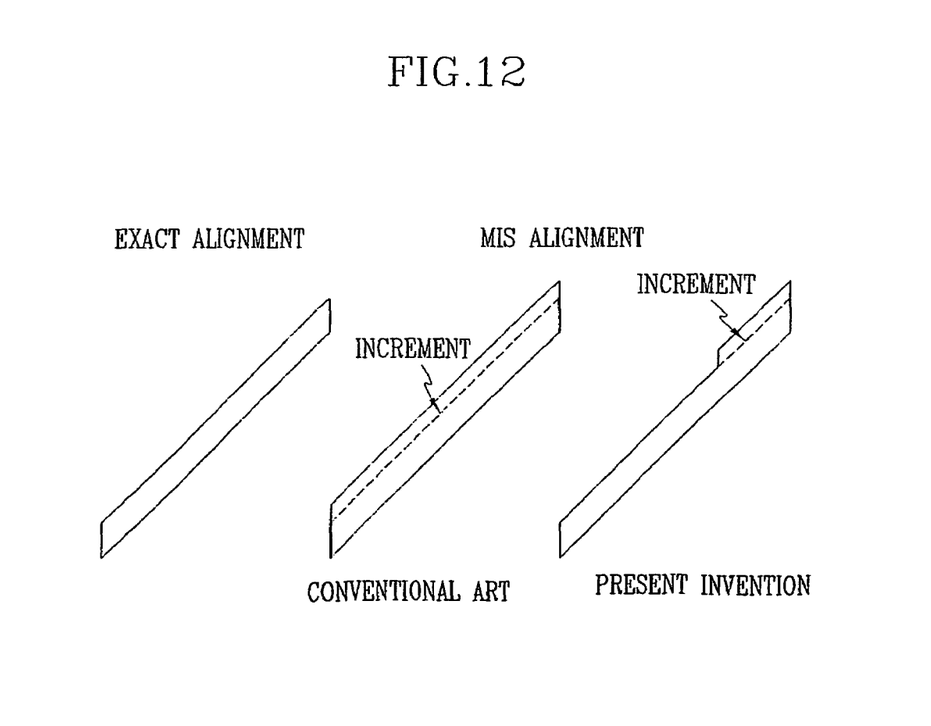
FIG. 12 shows the change of a subarea under exact alignment and misalignment.

FIG. 12 shows the change of a subarea under exact alignment and misalignment. In FIG. 12, a figure represented as "exact alignment" is an expected subarea, and a figure represented by "misalignment" is an increased subarea due to the misalignment.

Upon misalignment, the increment takes only a portion of the total length in the embodiment of the present invention, while the increment take all portions of the total length according to a conventional art. Therefore, according to the present invention, the width of a subarea offset from an expected value under misalignment considerably decreases compared with a conventional art.

Meanwhile, a plurality of photolithography steps, that is, a plurality of exposures for a plurality of layers are required for forming wires, pixel electrodes, and switching elements of an LCD, especially of an active matrix type LCD ("AM-LCD"). In this case, it is required to align the stitch area and the unit stitch areas in the exposure process of the plurality of layers for gradually changing the brightness with accuracy. In addition, stitch areas or unit stitch areas may be differed or the stitch areas for a specific layer(s) may have linear or saw shapes.

As described above, the brightness difference due to stitch errors in an LCD panel is reduced by gradually changing the exposure areas between right and left shots in a divisional exposure process of the LCD panel.

What is claimed is:

1. A method of manufacturing a liquid crystal display by divisionally exposing an active area with a plurality of shots including first and second shots adjacent to each other, the method comprising:
   preparing a stitch area which is an overlapping area of the first and the second shots at a boundary between the first shot and the second shot; and
   performing gradual decrease of an area for the first shot and gradual increase of an area for the second shot in the stitch area along a direction from the first shot to the second shot,
   wherein the decrease of an area for the first shot and the increase of an area for the second shot are preformed by unit of a unit stitch area obtained by dividing a pixel area into at least two parts, a subarea-dividing member is provided in a pixel area, and the subarea-dividing member is located at a boundary between the unit stitch areas, the subarea-dividing member being defined by at least one of a pixel electrode and a common electrode.

2. The method of claim 1, wherein the pixel area is defined by intersections of two adjacent gate lines and data lines and the unit stitch area is defined by one of areas obtained by dividing the pixel area along a division line substantially parallel to the gate lines.

3. The method of claim 2, wherein the pixel area is defined by intersections of two adjacent gate lines and data lines and the unit stitch area is defined by one of areas obtained by dividing the pixel area along a division line substantially parallel to the data lines.

4. The method of claim 1, wherein the pixel area is defined by intersections of two adjacent gate lines and data lines and the unit stitch area is defined by one of areas obtained by dividing the pixel area along a division line substantially parallel to the data lines.

5. The method of claim 1, wherein the subarea-dividing member is one of an aperture, a protrusion, and a depression.

6. The method of claim 1, wherein the subarea-dividing member is formed in at least one of The pixel electrode and the common electrode.

7. A method of manufacturing a liquid crystal display by divisionally exposing an active area with a plurality of shots including first and second shots adjacent to each other, the method comprising:

preparing a stitch area which is an overlapping area of the first and the second shots at a boundary between the first shot and the second shot; and performing gradual decrease of an area for the first shot and gradual increase of an area for the second shot in the stitch area along a direction from the first shot to the second shot, wherein the decrease of an area for the first shot and the increase of an area for the second shot are preformed by unit of a unit stitch area obtained by dividing a pixel area into at least two parts, a subarea-dividing member is provided in a pixel area, and the subarea-dividing member is located at a boundary between the unit stitch areas, and wherein the pixel area is defined by intersections of two adjacent gate lines and data lines and the unit stitch area is defined by one of areas obtained by dividing the pixel area along a division line substantially parallel to the gate lines and along a division line substantially parallel to the data lines.

* * * * *